Oct. 31, 1939.   F. T. COURT   2,178,249
HITCH DEVICE
Filed May 18, 1938
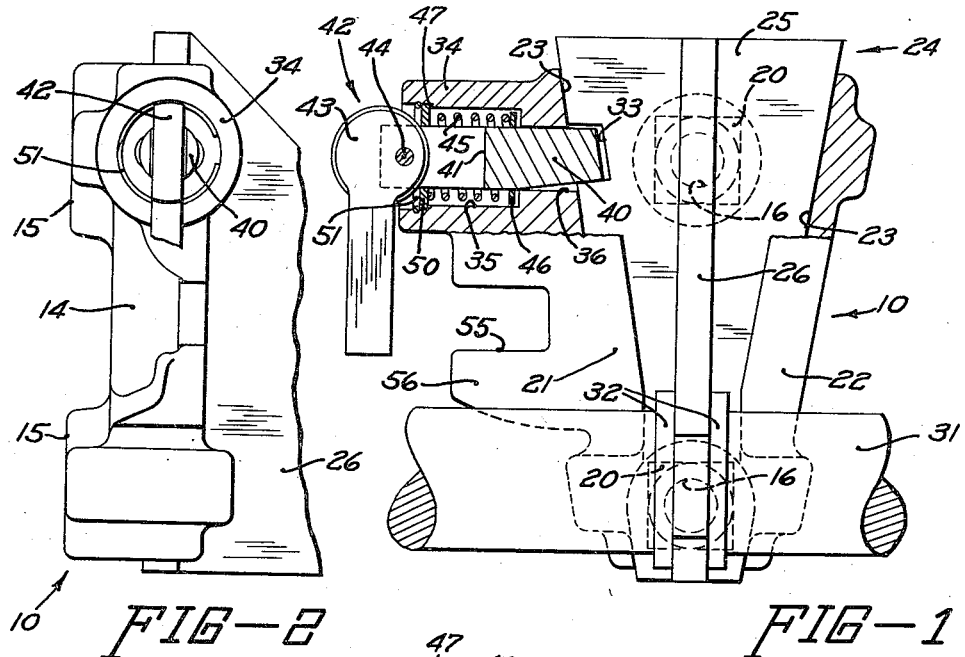
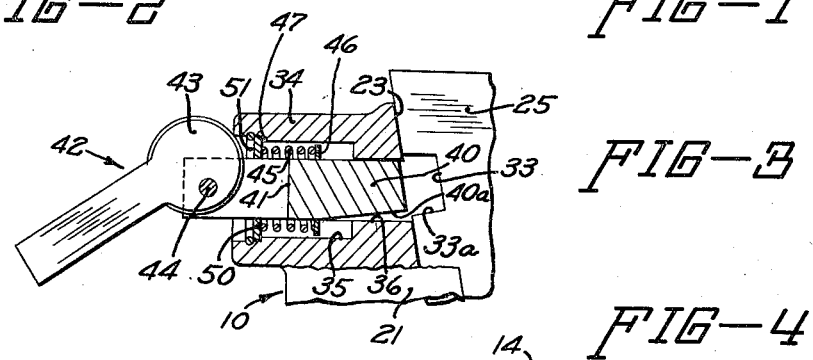
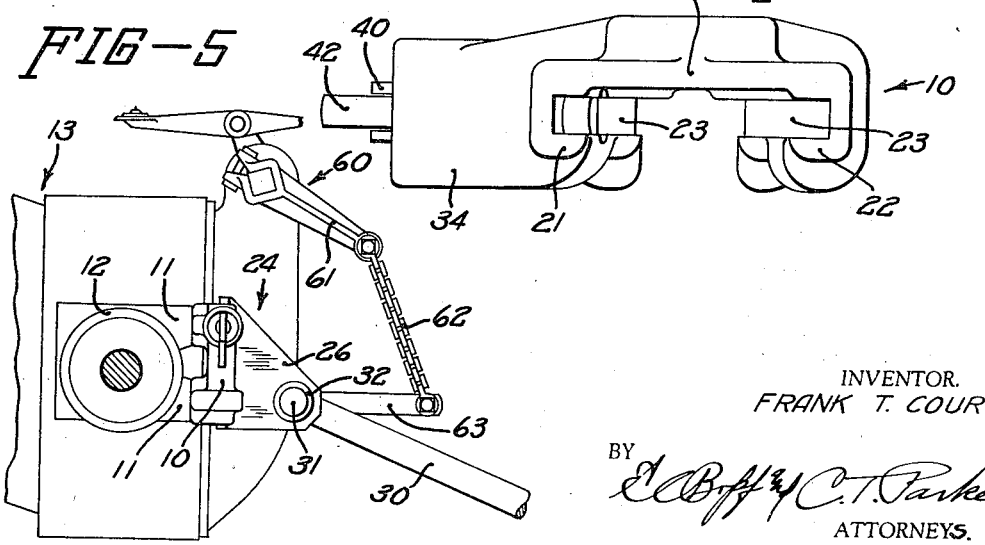
INVENTOR.
FRANK T. COURT
BY
ATTORNEYS.

Patented Oct. 31, 1939

2,178,249

UNITED STATES PATENT OFFICE 2,178,249

HITCH DEVICE

Frank T. Court, Moline, Ill., assignor to Deere & Company, Moline, Ill., a corporation of Illinois Application May 18, 1938, Serial No. 208,600

11 Claims. (Cl. 280—33.15)

The present invention relates to connecting devices for mounting implements on a tractor, and is more particularly concerned with quick detachable devices of the type comprising a receiving portion fixed to the tractor body and a readily detachable complementary connecting portion carried on the implement frame and adapted to be fixedly secured to the receiving portion.

The principal object of the present invention is to provide a simple, inexpensive and positive-acting connecting device for quickly and easily attaching implements to, and detaching them from the tractor body without the use of tools.

Another object is to provide a lock for such a connecting device which automatically locks the two complementary portions together when they are engaged and which is readily unlocked to disconnect the implement from the tractor.

These and other objects and advantages of the present invention will become apparent after a consideration of the following detailed description of the preferred embodiment thereof, together with the appended drawing, in which:

Figure 1 is a partially sectioned front elevation of my invention, showing the two complementary portions locked together;

Figure 2 is a side elevation of the device shown in Figure 1;

Figure 3 is a sectioned detail view of the locking device in the unlocked position;

Figure 4 is a top view of the receiving portion; and

Figure 5 is a view showing my invention mounted on a tractor and connecting an implement draft frame thereto.

Referring now to the drawing, the quick detachable implement connecting device illustrated therein comprises a bracket member, indicated in its entirety by the reference numeral 10, which is adapted to be connected to the usual rearwardly facing implement mounting bosses 11 provided on the rear axle housing 12 of a tractor 13, as shown in Figure 5. The bracket 10 is preferably made in the form of a casting and includes a back 14 having two vertically spaced, raised bearing portions 15 adapted to bear against the faces of the tractor bosses 11. Each of the raised bearing portions 15 is provided with a countersunk aperture 16, and the bracket member 10 is bolted to the tractor bosses 11 by bolts 20 which are passed through the apertures 16 and screwed into threaded holes provided in the bosses. The sides 21 and 22 of the bracket member 13 project rearwardly from the back 14 and converge downwardly, defining a substantially wedge-shaped channel therebetween. Each of the sides is grooved on its inner face to provide a slot 23, and both slots lie in the same plane.

A complementary connecting member, indicated generally by the reference numeral 24, comprises a wedge-shaped plate 25 and a bracket plate 26 fixed perpendicular thereto, as by welding, along the vertical axis of the plate 25. The edges of the wedge-shaped plate 25 converge downwardly, corresponding to the edges 21, 22 of the bracket member 10, and are adapted to be received in the slots 23 when the connecting member 24 is lowered thereinto from above. The bracket plate 26 is suitably fixed to the draft member 30 of an implement (not shown) and in the embodiment shown herein said draft member 30 includes a transverse cylindrical portion 31 which is journaled in a bearing portion 32 provided in the plate 26. A notch 33 having one edge 33a inclined slightly downward is provided in one edge of the plate 25 to receive a latch member 40, now to be described.

The connecting member 24 is prevented from being unintentionally lifted out of its seat in the slots 23 by means of a lock which is disposed within a transversely disposed tubular barrel portion 34 formed integral with the side 21 near the top thereof. The barrel portion 34 is provided with a cylindrical aperture 35 which is connected by another aperture 36, of reduced diameter, with the slot 23. A cylindrical latch or plunger 40 is disposed centrally within the aperture 35 and extends through the aperture 36 to project into the notch 33 when the connecting member 24 is seated. The underside of the end of the plunger 40 is planed off, as at 40a, to provide an angularly disposed cam surface adapted to cooperate with the edge 33a of the notch 33 to wedge the plate 25 down into its seat. The opposite end of the plunger 40 is slotted lengthwise, as at 41, and disposed within this slot is an unlocking lever 42. The latter is provided at its end with a circular cam portion 43 and is pivotally connected to the split end of the plunger by a pin 44 passed through the cam portion 43 in off-center relation. The cam portion 43 is adapted to bear against the edge of the barrel portion 34 as the lever 42 is turned about the pin 44 and thus withdraw the plunger from the notch 33.

A coil spring 45 disposed within the aperture 35 and bearing against a suitable shoulder 46 provided on the plunger 40, urges the latter in the direction of the wedge-shaped member 25. The other end of the spring 45 bears against a retaining washer 50 which is held against a shoulder 47 in the barrel portion 34 by a split ring 51 in a manner well known to those skilled in the art.

To connect an implement to the tractor 13 using this quick detachable connecting device, it is necessary only to lower the connecting member 24, which would normally be provided on each of the implement draft members, into the slots 23 and then tap lightly. The sloping sides of the wedge-shaped member 25 act to push the plunger back into the barrel portion against the pressure of the spring 45 until the notch 33 comes into register, and then the plunger drops into the notch. The cam surface 40a, bearing against the inclined edge 33a of the notch, holds the plate 25 down in firm seating engagement by its wedging action, locking the connecting member 24 to the bracket member 10 until the unlocking lever is again swung upwardly, as shown in Figure 3.

If it is desired to anchor bracing rods to the tractor bosses 11, as when an extension drawbar is attached to the tractor body, without removing the brackets 10 or without providing connecting members 24 for each of the bracing rods used under all conditions, such bracing rods may be connected to the bracket member 10 by a carriage bolt or other suitable connecting means held in the square notch 55 provided in the web portion 56 disposed below the barrel portion 34 and forming part of the side 21.

Figure 5 illustrates one way in which an implement might be connected to the tractor to make use of the engine driven power lift mechanism, indicated at 60. In this example the lifting arm 61 of the power lift 60 is connected by a chain 62 to a lever arm 63 fixed to the transverse shaft portion 31, and when the lifting arm is raised the draft member 30 is raised with it. When the power lift 60 is actuated, the plunger 40 prevents the plate 25 from being lifted out of the slot 23.

What I claim as my invention is:

1. A device for detachably connecting implements to a tractor comprising, in combination, a bracket member adapted to be fixed to the tractor body and having a recess, a complementary connecting member secured to the implement draft member and adapted to fit within said recess and to be held therein against movement in all but one direction, and means for locking said connecting member within said recess against movement in said one direction, said means comprising a plunger slidably disposed within said bracket member and adapted to project into said recess, and spring means for yieldingly urging one end of the plunger into said recess, said connecting member having an inclined surface adapted to act against said plunger to depress the same when the connecting member is inserted into said recess, and a notch into which the plunger is forced by said spring means when the connecting member is seated.

2. A device for detachably connecting implements to a tractor comprising, in combination, a bracket portion fixed relative to the tractor body and having a wedge shaped recess, a complementary wedge-shaped connecting member secured to the implement and adapted to fit down into said recess and to be held therein against movement in all directions except upward, and means for locking said connecting member within said recess against upward movement relative thereto, said means comprising a latch member, means for yieldably forcing said latch into engagement with said connecting member, and means for disengaging said latch from said connecting member.

3. A device for detachably connecting implements to a tractor comprising, in combination, a bracket member having downwardly converging sides provided with slots in their inner faces, means for securing said bracket member to the tractor body, a complementary wedge-shaped connecting plate member having converging edges adapted to slide into said slots and wedge into seating engagement therein, said plate member being supported in said slots and held thereby against twisting movement in any direction, and means for securing said connecting member to the implement.

4. For use with a tractor having substantially vertically disposed implement mounting bosses, a device for detachably connecting implements to said tractor comprising a bracket member having a back and downwardly converging sides extending perpendicular thereto, said sides being provided with vertically disposed slots in their inner faces, means for securing said bracket member to one of said implement mounting bosses, a wedge-shaped connecting member having downwardly converging sides adapted to be received by said slots, means for securing said connecting member to the implement, and means for holding said connecting member in seated engagement with said bracket member.

5. A device for detachably connecting implements to a tractor comprising, in combination, a bracket member having a back and downwardly converging sides extending perpendicular thereto, said sides being provided with vertically disposed slots in their inner faces, means for securing said bracket member to the tractor body, a wedge-shaped connecting member having downwardly converging sides adapted to be received by said slots, and locking means comprising a detent member projecting laterally inward through an aperture provided in one of said slots, said connecting member being recessed in one side to receive said detent member when fully seated, means for yieldably urging said detent member against the side of said connecting member, and means for withdrawing said detent member from said recess to unlock said connecting member from said bracket member.

6. A device for detachably connecting implements to a tractor comprising, in combination, a bracket member having a back and downwardly converging sides extending perpendicular thereto, said sides being provided with vertically disposed slots in their inner faces, means for securing said bracket member to the tractor body, a wedge-shaped connecting member having downwardly converging sides adapted to be received by said slots, locking means comprising a tubular barrel portion provided on one of said sides and disposed transversely of said bracket member, said side being apertured to connect said barrel portion with its adjacent slot, a locking plunger disposed within said barrel portion and projecting through said aperture into the slot, said connecting member being recessed on one side to receive said plunger when the connecting member is fully seated in said slots, spring means disposed within said barrel portion and bearing against said plunger to urge the latter against the side of said connecting member, and means for withdrawing said detent from said recess against the pressure of said spring means to unlock said connecting member from said bracket member.

7. For use with a tractor having substantially vertically disposed implement mounting bosses, a device for detachably connecting implements to said tractor comprising a bracket member having a back and downwardly converging sides extending perpendicular thereto, said sides being provided with vertically disposed slots in their inner faces, means for securing said bracket member to the tractor body, a wedge-shaped connecting member having downwardly converging sides adapted to be received by said slots, and locking means comprising a tubular barrel portion integral with and extending laterally from one of the sides of said bracket member, said side being apertured to connect said barrel portion with its adjacent slot, a locking plunger disposed within said barrel portion and projecting through said aperture into the slot, said connecting member being recessed on one side to receive the end of said plunger when the connecting member is fully seated, a coil spring disposed within said barrel portion and bearing against said plunger to urge the latter inwardly, and means for unlocking said connecting member from said bracket member comprising a cam lever pivotally connected to said plunger and adapted to bear against said barrel portion to withdraw the plunger from said connecting member recess.

8. A connecting device comprising a bracket portion having a wedge-shaped recess, a complementary wedge-shaped connecting member adapted to fit down into said recess and to be held therein against movement in all directions except upward, and locking means for holding said connecting member against upward movement relative to said bracket portion, said locking means comprising a spring backed plunger having a cam surface disposed at an angle to the axis thereof, and said connecting member having a recess adapted to receive said plunger and cooperate with the cam surface thereof to hold said connecting member down in firm seating engagement within said bracket recess.

9. A connecting device comprising a bracket member having a recess formed therein, a complementary connecting member having a portion adapted to fit down into said recess and to be held therein against movement in all but one direction, a spring backed plunger slidably disposed within said bracket member and having one end thereof extending into said recess, a camming surface on said connecting member for forcing said plunger out of said recess when the connecting member is inserted thereinto, said connecting member having a notch into which said plunger is adapted to spring when the connecting member is fully seated for holding the latter against movement in said one direction, said plunger having a cam surface adapted to coact with at least one edge of said notch whereby the plunger exerts a wedging effect on said connecting member.

10. A connecting device comprising a bracket member having a downwardly tapering recess formed therein, a complementary tapering connecting member adapted to fit down into said recess and to be held therein against movement in all directions except upward, and a spring biased locking plunger slidably disposed in said bracket member and adapted to cooperate with said connecting member for wedging the latter down into firm seating engagement with the bracket member.

11. A device for detachably connecting implements to a tractor comprising, in combination, a bracket member having downwardly converging sides provided with slots in their inner faces, means for securing said bracket member to the rear axle housing of the tractor in transverse position thereon, a transversely disposed complementary wedge-shaped connecting plate member having converging edges adapted to engage said slots for holding the implement draft member against lateral twisting relative to the tractor, and means for securing said plate member to the implement draft member substantially perpendicular thereto for supporting the latter on said plate member.

FRANK T. COURT.